United States Patent [19]

Mullins

[11] 4,099,423
[45] Jul. 11, 1978

[54] COMPATIBLE SPROCKET AND CHAIN SYSTEM

[76] Inventor: Max Mullins, c/o Nel Mullins, 13700 N.E. Miami Court, Miami, Fla. 33161

[21] Appl. No.: 808,470

[22] Filed: Jun. 21, 1977

[51] Int. Cl.² .................. F16H 55/30; F16G 13/02
[52] U.S. Cl. ............................. 74/243 R; 74/245 R
[58] Field of Search ............ 74/243 B, 245 R, 243 R, 74/217 R

[56] References Cited

U.S. PATENT DOCUMENTS

| | | | |
|---|---|---|---|
| 3,237,470 | 3/1966 | Birk | 74/243 B X |
| 3,448,629 | 6/1967 | Pfrank et al. | 74/243 R X |
| 3,498,148 | 3/1970 | Gerbasi et al. | 74/243 R X |

*Primary Examiner*—Leonard H. Gerin
*Attorney, Agent, or Firm*—Gustave Miller

[57] ABSTRACT

This is a compatible sprocket and chain system wherein each sprocket has a minimum of five teeth, and the chain has a minimum of nine links and rollers. In this system, the number of sprocket teeth and the number of links and rollers is always an odd number, and a table is set forth in the specification disclosing the number of sprocket teeth in each sprocket that are compatible with each other sprocket and the number of chain links, and how many sprocket teeth may be used in each of the pair of sprockets when one sprocket is of a different size than the other.

3 Claims, 1 Drawing Figure

CUT FOR CLEARANCE

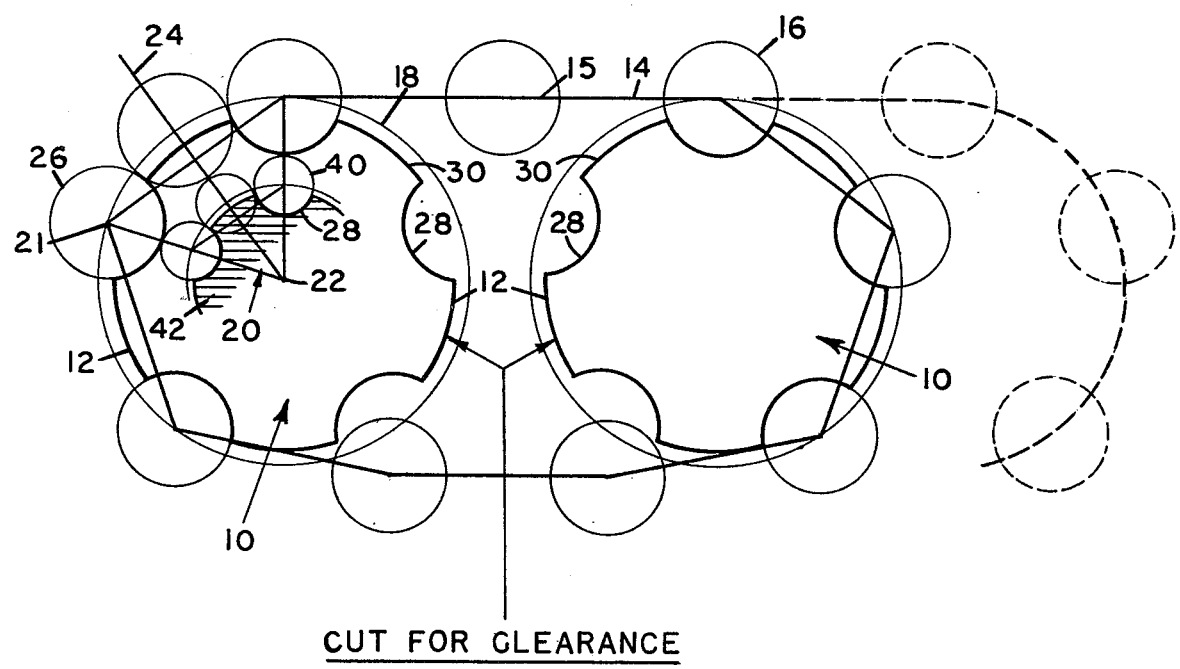
CUT FOR CLEARANCE

4,099,423

COMPATIBLE SPROCKET AND CHAIN SYSTEM

SUMMARY OF THE INVENTION

This device is a system of providing compatible sprocket teeth and chain links, there being a minimum of five teeth on each of the pair of sprockets and a minimum of nine links in the compatible chain. Depending on the spacing of the sprockets, the number of links in the chain may be increased from nine by twos, so that the chain always has an odd number of links. Each sprocket also has an odd number of teeth and the number of teeth may be increased according to the table, as set forth below in the specification.

This invention is based on the discovery that the most efficient and strongest sprocket and chain system must each have an odd number of teeth. To design the shape of the teeth, an even number of circles, twice the number of teeth in the finished sprocket, are arranged tangentially with their centers in a circle on the edge of a circular sprocket blank. Then alternate circles are cut into the blank edge, providing link chain roller-receiving depressions, and the intermediate circles are eliminated, providing the sprocket teeth therebetween, which teeth are then cut somewhat to permit clearance for the chain link rollers, it being noted that the chain link rollers are substantially of the same radius as the sprocket depressions, there thus being an odd number of sprocket teeth, minimum five, and an odd number of chain links, minimum nine.

OBJECT OF THIS INVENTION

It is an object of this invention to provide a compatible chain and sprocket system that is very much stronger and more endurable than the conventional chain and sprocket arrangement.

A further object of this invention is to provide a compatible sprocket and chain system wherein each sprocket has a minimum of five teeth and the compatible chain has a minimum of five roller links.

A further object of this invention is to provide a sprocket and chain system wherein the radius of the rollers in the chain is the same as the radius of the roller-receiving recesses between the teeth in the sprocket, and the sprocket teeth are cut to provide clearance by the rollers.

Yet a further object of this invention is to provide an odd number of teeth in the sprocket and odd number of links in the chain, the number of teeth being as set forth in the table below in the specification.

A further object of this invention is to provide a very strong sprocket and chain system wherein the sprocket roller-receiving recesses are shallower than the radius of the chain rollers to permit clearance.

A still further object of this invention is to provide a novel compatible sprocket and chain system which provides a maximum of strength for both sprocket and chain.

A further object of this invention is to provide a sprocket and chain system where rollers of the chain and the roller-receiving recesses of the sprocket are spaced apart a distance equal to the diameter of the rollers.

A further object of this invention is to provide sprocket teeth that are cut away a reasonable amount between the roller-receiving recesses to permit the rollers to readily enter and leave the recesses.

BRIEF DESCRIPTION OF THE FIGURE

With the foregoing and other objects in view, this invention comprises the combination, constructions and arrangements of parts hereinafter set forth, claimed and disclosed in the accompanying drawings, wherein:

The FIGURE is a diagrammatic showing of the sprockets and chain system of this invention, showing the minimum number of gear teeth and chain links possible with this invention, and showing diagramatically how a longer chain may be used.

DETAILED DESCRIPTION OF THE INVENTION

There is shown a sprocket and chain system of this invention, the sprocket 10 is made with an odd but minimum number of teeth 12, that is five, and the compatible chain 14 is provided with the minimum number of rollers 16, that is nine. There is always an odd number of sprocket teeth 12 from five up and an odd number of link rollers from nine up. The number of chain link rollers 16 may be increased by two's as desired, to any number, and the number of teeth 12 in both sprockets may likewise be increased by two's, so long as both sprockets have the same number of teeth. However, if one sprocket is to have a greater number of teeth 12 than the other, the numbers of sprocket teeth 12 must conform to the table of teeth numbers below.

To set up the teeth 12 on a sprocket blank 18, the sprocket blank is made circular. If five teeth 12 are to be provided, the circular gear blank 18 is divided into an odd number of equal triangles 20 with each triangle apex 22 located at the circular center of the blank 18. Ten equal circles are laid out with their centers located in the circular blank edge. Each apex angle 22 is equally divided by a radius line 24 intersecting the circular blank edge. Then ten equal circles 26 will be drawn tangent to each other, the corners 21 of the original triangles 20 at the edge of the blank 18 and the intersection of triangle dividing radius line 24 with the circular blank, all lying in the circular edge of the blank 18, providing the center points for drawing the tangent circles 26, of course all with the same radius. Then chain roller-receiving recesses 28 are cut into the edge of the sprocket blank 18 curved the same as the circles 26, also having the same radius as the rollers 16, which therefor move smoothly into and out of the recesses 28.

To permit the rollers 16 in links 15 to readily enter and leave the recesses, the edges of the blank 18 between the recesses 28 are cut away a small reasonable amount when providing the sprocket teeth 30.

As shown by the smaller circles 40 superimposed with the smaller sprocket blank 42, within the original blank 18, the same principles apply irrespective of the size of the sprocket being produced with the same number of teeth.

Both sprockets of the system may have the same odd numbered teeth, and the chain link rollers 16 are spaced apart on chain 14 a distance equal to the diameter of the recesses 28. To provide a greater odd number of teeth on one sprocket gear than on its companion gear, the larger sprocket blank is divided into an odd number of equal triangles corresponding to the following table, and the circles for determining the teeth are provided in the same manner.

TABLE

One sprocket is compatible with the other sprocket 5 teeth are compatible with 5 or 19, 17, 21, 25, increasing by 4's indefinitely
7 teeth are compatible with 7 or 13, 25, 31, 37, increasing by 6's indefinitely
9 teeth are compatible with 9 or 17, 33, 41, 49, increasing by 8's indefinitely
11 teeth are compatible with 11 or 21, 41, 51, 61, increasing by 10's indefinitely
13 teeth are compatible with 13 or 25, 49, 61, 73, increasing by 12's indefinitely
15 teeth are compatible with 15 or 29, 57, 71, 85, increasing by 14's indefinitely
17 teeth are compatible with 17 or 33, 37, 41, 45, increasing by 4's indefinitely
19 teeth are compatible with 19 or 37, 41, 45, 49, increasing by 4's indefinitely
21 teeth are compatible with 21 or 41, 45, 49, 53, increasing by 4's indefinitely
23 teeth are compatible with 23 or 45, 49, 53, 57, increasing by 4's indefinitely
25 teeth are compatible with 25 or 49, 53, 57, 61, increasing by 4's indefinitely
27 teeth are compatible with 27 or 53, 57, 61, 65, increasing by 4's indefinitely
29 teeth are compatible with 29 or 57, 61, 65, 69, increasing by 4's indefinitely
31 teeth are compatible with 31 or 61, 65, 69, 73, increasing by 4's indefinitely
33 teeth are compatible with 33 or 37, 41, 45, 49, increasing by 4's indefinitely
35 teeth are compatible with 35 or 39, 43, 47, 51, increasing by 2's downwardly and then by 4's horizontally to the right indefinitely.

ABSTRACT OF THE DRAWING

In the drawing, like numbers refer to like parts, and for the purposes of explication, marshalled below are the numbered parts of the improved Compatible Sprocket and Chain System of this invention.
10 sprocket
12 teeth
14 chain
15 chain links
16 rollers
18 sprocket blank
20 equal triangles on sprocket blank 18
21 equal triangle apexes at circumference of blank 18
22 equal triangle apexes at center of blank 18
24 radius line dividing 20 equally
26 circles with centers on circular edge of blank 18 providing recesses 28
28 recesses between teeth 12
30 cut away teeth in blank 18
40 smaller superimposed circles of 42
42 smaller superimposed blank Although this invention has been described in considerable detail, such description is intended as being illustrative rather than limiting, since the invention may be variously embodied.

Having thus set forth and disclosed the nature of this invention, what is claimed is:

1. A compatible sprocket and chain system wherein each sprocket (18) has an odd number of teeth (30), there being a minimum of five teeth, and the chain (14) has an odd number of links (15) and rollers (16), there being a minimum of nine links (15) and rollers (16), wherein the shape of the sprocket of the sprocket is set up with twice the number of circles, as the desired number of sprocket teeth (12), the circles (26) being arranged circumferentially and contacting each other on a sprocket blank (18), then cutting into the blank the recesses (28) provided by alternate circles (26) and discarding the intermediate circles, the chain (114) having link rollers (16) of the same radius as the cut-in recesses (28) of the sprocket blank (18), the sprocket edge being cut away a reasonable distance, between the recesses, to permit clearance of the link rollers (16).

2. The compatible sprocket and chain system of claim 1, wherein the number of chain links (15) and rollers (16) may be increased by twos, and the number of sprocket teeth (12) in each sprocket (18) may also be increased by an equal number of two's.

3. The compatible sprocket and chain system of claim 1, wherein the number of links (65) and rollers (16) may be increased as needed, by two's, and the number of teeth in one sprocket may be increased to greater than the number of teeth in the other sprocket only in accordance with the following table: one sprocket is compatible with the other sprocket; 5 teeth are compatible with 5 or 9, 17, 21, 25, increasing by 4's indefinitely; 7 teeth are compatible with 7 or 13, 25, 31, 37, increasing by 6's indefiniely; 9 teeth are compatible with 9 or 17, 33, 41, 49, increasing by 8's indefinitely; 11 teeth are compatible with 11 or 21, 41, 51, 61, increasing by 10's indefinitely; 13 teeth are compatible with 13 or 25, 49, 61, 73, increasing by 12's indefinitely; 15 teeth are compatible with 15 or 29, 57, 71, 85, increasing by 14's indefinitely; 17 teeth are compatible with 17 or 33, 37, 41, 45, increasing by 4's indefinitely; 19 teeth are compatible with 19 or 37, 41, 45, 49, increasing by 4's indefinitely; 21 teeth are compatible with 21 or 41, 45, 49, 53, increasing by 4's indefinitely; 23 teeth are compatible with 23 or 45, 49, 53, 57, increasing by 4's indefinitely; 25 teeth are compatible with 25 or 49, 53, 57, 61, increasing by 4's indefinitely; 27 teeth are compatible with 27 or 53, 57, 61, 65, increasing by 4's indefinitely; 29 teeth are compatible with 29 or 57, 61, 65, 69, increasing by 4's indefinitely; 31 teeth are compatible with 31 or 61, 65, 69, 73, increasing by 4's indefinitely; 33 teeth are compatible with 33 or 37, 41, 45, 49, increasing by 4's indefinitely; 35 teeth are compatible with 35 or 39, 43, 47, 51, increasing by 2's downwardly and then by 4's horizonally to the right indefinitely.

* * * * *